May 19, 1925.
W. B. MURRAY
WINDSHIELD
Filed Oct. 30, 1922
1,538,443
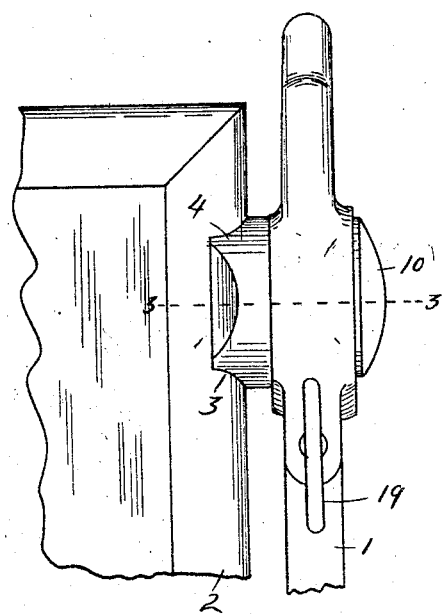
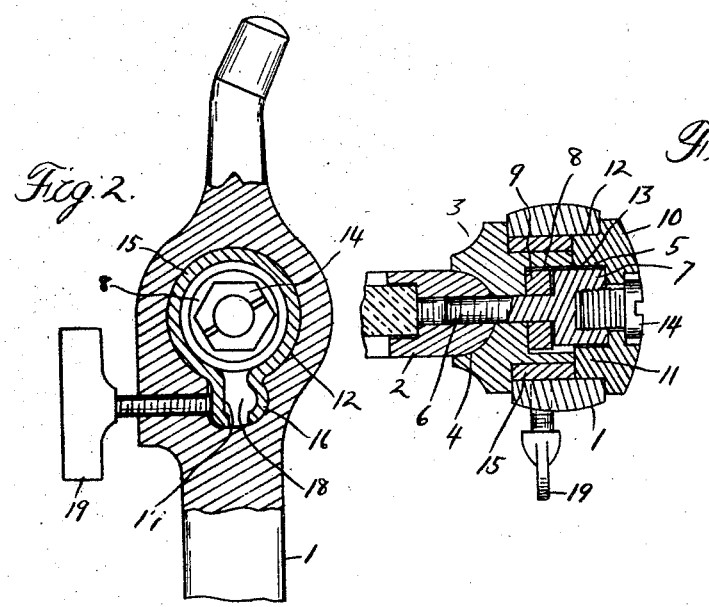
Inventor
William B. Murray
Attorneys Patented May 19, 1925.

1,538,443

UNITED STATES PATENT OFFICE.

WILLIAM B. MURRAY, OF ANN ARBOR, MICHIGAN, ASSIGNOR TO MOTOR PRODUCTS CORPORATION (1923), OF DETROIT, MICHIGAN, A CORPORATION OF NEW YORK.

WINDSHIELD.

Application filed October 30, 1922. Serial No. 597,972.

*To all whom it may concern:*

Be it known that I, WILLIAM B. MURRAY, a citizen of the United States of America, residing at Ann Arbor, in the county of Washtenaw and State of Michigan, have invented certain new and useful Improvements in Windshields, of which the following is a specification, reference being had therein to the accompanying drawings.

The invention relates to windshields and refers particularly to the pivotal mountings of a windshield. One of the objects of the invention is the provision of a simple effective clamp for locking the frame and standard of the windshield from relative rotation, the clamp being arranged in the standard without appreciably weakening the same. Another object is to provide a friction band housed within each standard and surrounding each windshield frame trunnion, this friction band being adjustable to lock the trunnion from rotation relative to the standard in which it is mounted. With these objects in view, the invention resides in the novel features of construction as more fully hereinafter set forth.

In the drawings:

Figure 1 is a rear elevation of a portion of a windshield embodying my invention;

Figure 2 is a sectional side elevation thereof;

Figure 3 is a cross section on the line 3—3 of Figure 1.

1 is one of a pair of windshield standards and 2 is the frame for one of the glass sections. This frame has secured thereto at each of its sides the trunnion 3 having a bifurcated inner end 4 embracing the frame and the cylindrical or pivotal outer end 5 located within the standard 1. This trunnion is secured to the frame by the screw 6 having its shank threadedly engaging in the frame and its head 7 entering into the axial recess 8 in the outer end of the cylindrical or pivotal portion of the trunnion. There is preferably a lock washer 9 surrounding the shank of the screw and located between its head and the inner end of the recess. 10 is a cap having a cylindrical portion 11 engaging in the transverse bore 12 in the standard 1, this cylindrical portion having a polygonal recess 13 for engaging over the head 7 of the screw. Both the trunnion and cap have opposed shoulders for engaging respectively the inner and outer sides of the standard and the cap is secured in place by the screw 14 threadedly engaging the head of the screw 6 axially thereof.

15 is a friction band surrounding the cylindrical or pivotal portion 5 of the trunnion and located in the transverse bore 12 of the standard between the shoulder upon the trunnion and the inner end of the cylindrical portion of the cap. This band has radially outwardly extending ends 16 and 17 which engage in the recess 18 formed in the inner side of the standard 1 below the transverse bore 12 and communicating therewith. For contracting the friction band, there is the thumb screw 19 threadedly engaging the standard and adapted to abut the end 17 of the friction band to force the same toward its other end 16, this latter end being held from movement by reason of the wall of the recess 18.

With this arrangement, the clamping action of the friction band is very positive, and furthermore the arrangement of parts is compact. Another important feature is that the friction band, being located in the inner side of the standard, is concealed and the ends of the friction band engaging in a comparatively small recess in the standard, the latter is not weakened appreciably.

What I claim as my invention is:

In a windshield pivot mounting, the combination with a windshield and a supporting standard therefor, of a trunnion having a shoulder abutting one side of the standard and having a socket portion extending transversely of the standard, a cap engaging the opposite side of said standard and having a socket portion abutting the socket portion of the trunnion, a headed element securing the trunnion to the windshield, the head of said element being located within the socket portion of said trunnion and the socket portion of said cap, a lock washer surrounding the headed element within the socket portion of said trunnion between the face of said socket portion and the head of said element, a friction band surrounding the socket portion of the trunnion between the shoulder thereof and the socket portion of said cap, and means carried by said standard for actuating said band.

In testimony whereof I affix my signature.

WILLIAM B. MURRAY.